United States Patent Office 3,210,394
Patented Oct. 5, 1965

3,210,394
COREACTED MANGANESE-METAL ETHYLENE-BISDITHIOCARBAMATES
Joseph W. Nemec, Rydal, Victor H. Unger, Willow Grove, and Channing Bruce Lyon, Abington, Pa., assignors to Rohm & Haas Company, Philadelphia, Pa., a corporation of Delaware
No Drawing. Filed May 9, 1961, Ser. No. 108,736
13 Claims. (Cl. 260—429)

This invention concerns fungicidal compounds which contain manganese and one or more metals from the class consisting of zinc, cobalt, nickel, iron, copper, and lead, both the manganese and the other metal or metals being bound to ethylenebisdithiocarbamate ions. This invention also concerns the process by which these compounds are prepared, the compositions in which they may be used, and their application to plants or their environment to control fungi.

Salts of ethylenebisdithiocarbamic acid were shown in U.S. Patent No. 2,317,765 to W. F. Hester to be highly valuable fungicidal agents and such salts as the zinc salt, known as zineb, and the insoluble manganese salt, known as maneb, have been widely and effectively used to control a variety of plant diseases. Nevertheless, studies have continued with the object of finding agents which provide equivalent control at lower rates of application, or which are more effective at the same rate of application as used for zineb or maneb, or which are even safer on tender foliage, or which retain effectiveness against plant diseases for extended periods of time, or which are active against a wide spectrum of plant diseases, or which possess a combination of such improved properties.

Mixtures of various metal salts have been proposed to increase stability. For example, it has been proposed to provide a better degree of stability of manganese dimethyldithiocarbamate by forming a mixture of this material with zinc dimethyldithiocarbamate. One way of forming such a mixture is to precipitate this manganese salt in admixture with the zinc salt. With dialkyl-dithiocarbamic acid only mixtures of salts can be thus prepared, whereas with the ethylenebisdithiocarbamates the outcome is very different.

It has now been discovered that when a mixture of a water-soluble salt of manganese and of a water-soluble salt of zinc, nickel, cobalt, iron, copper, or lead is reacted as herein described in solution with a water-soluble salts of ethylenebisdithiocarbamic acid, there results a new kind of compound. It contains manganese and the other metal or metals bound at their several valences to ethylenebisdithiocarbamate ions. Since the metal ions are polyvalent and the ethylenebisdithiocarbamate ion is divalent, the several kinds of ions are joined in a chain or lattice and the products are polymeric in nature.

The suggested name for these salts is coreacted manganese-metal ethylenebisdithiocarbamates. By coreacted is meant the reaction of ethylenebisdithiocarbamate ions with an equivalent amount of two or more water-soluble metal salts, one of which is a manganous salt, to form polymeric ethylenebisdithiocarbamates which contain the metals chemically combined in amounts corresponding essentially to their starting molar ratios.

Physical methods may be employed to distinguish the products of this invention over the equivalent physical mixtures of insoluble manganese ethylenebisdithiocarbamate with another metallic ethylenebisdithiocarbamate.

That the products here produced are not mixtures can be shown by X-ray diffraction diagrams. Mixtures show patterns having the combined patterns of the separate salts whereas the compounds of this invention give distinguishing lines or have other distinguishing features. The X-ray data here presented were obtained with a copper electrode and with a nickel filter, the radiation being identified as $CuK_\alpha$.

By way of example there may be considered the characteristic X-ray lines or peaks which are observed when corrected manganese-zinc ethylenebisdithiocarbamates are examined, these coreacted products having mole ratios of manganese to zinc within the range of 40:60 to 90:10. It is first observed that the lines which are characteristic for maneb at 8.00 A. and 6.51 A. are reduced in intensity in the coreacted products, while the lines which are characteristic of maneb, zineb, and the coreacted products at 6.90 A., 4.48A., and 3.03 A. are also varied in relative intensity. Some of the lines which are characteristic of pure zineb disappear. At the same time, a new line appears for the coreacted manganese-zinc ethylenebisdithiocarbamates at about 7.36 A. which is of medium intensity.

Another distinguishing feature of the X-ray diagram of the coreacted products is the broadening of lines and diffraction peaks. The pure, individual metal salts of ethylenebisdithiocarbamic acid tend to give relatively sharp lines or peaks even in mixtures.

These considerations will become clearer upon reference to the data obtained, summarized in Table I, for (1) the coreacted manganese-zinc ethylenebisdithiocarbamate made using a 70:30 mole ratio of manganese sulfate and zinc sulfate and the equivalent quantity of disodium ethylenebisdithiocarbamate (Compound E), (2) a mixture of 70% maneb and 30% zineb (Mix Z), (3) maneb alone, and (4) zineb alone. The relative intensities of the peaks are designated by S=strong, MS=medium-strong, M=medium, MW=medium-weak, W=weak, and VW=very weak.

TABLE I

X-ray diffraction peaks (A.)

| Maneb | Zineb | Mix Z | Compound E |
|---|---|---|---|
| 8.00, S | | 8.00, S | 8.00, M |
| | | | 7.36, M |
| 6.90, M | 6.90, S | 6.90, S | 6.90, M |
| 6.51, M | | 6.51, S | 6.51, W |
| | 4.81, M | 4.82, W | |
| 4.48, MS | 4.48, MW | 4.48, MS | 4.48, M |
| | 3.62, W | | |
| | 3.50, W | | |
| | 3.45, M | 3.45, VW | |
| | 3.25, W | | |
| 3.03, S | 3.03, MW | 3.03, S | 3.03, M |

The coreacted products from manganese and lead salts within the mole ratios of 40:60 and 90:10 also retain some of the lines of pure maneb, but at lowered intensity. For example, the lines at 8.00 A., 4.48 A., and 3.03 A. are all reduced in intensity. New lines appear at 9.60 A. (strong), 5.47 A. (weak), and 4.93 A. (weak.

The coreacted ethylenebisdithiocarbamates from manganous and ferric salts in which the ratio of metals remains as above are characterized by retention of the lines in maneb at 8.00 A., 4.48 A., and 3.03 A., but with reduction in intensity from strong to medium. A broad peak appears in the region 6.5 to 7.5 A. (medium). The X-ray lines or peaks are further characterized by general breadth.

The coreacted products made from manganous and ferrous salts within the mole ratios listed above retain lines characteristic of pure maneb with minor changes in intensity. For example, the 4.48 A. (medium-strong) line is somewhat reduced in intensity, as are also the lines at 8.0 A. and 3.0 A., while the 6.90 A. and the 6.51 A. lines are somewhat increased in intensity. A new medium-weak line appears at 7.36 A.

In the coreacted products with nickel or with cobalt the X-ray diagrams are characterized by broadening of the lines or peaks which are characteristic of maneb with a reduction of the intensity of all of the lines characteristic of maneb. For example, the lines at 8.00 A. and 3.03 A. which are strong with pure maneb are only medium for the coreacted products, while the line at 4.48 A. for pure maneb decreases in intensity in the coreacted products.

For the coreacted manganese-copper ethylenebisdithiocarbamates wherein the ratio of metals is in the range 40:60 to 90:10 there are two somewhat broad peaks which are characteristic. These occur at 7.65–7.80 A. and at about 3.86 A. At the same time the lines of medium intensity at 7.42 A., 5.25 A., 3.49 A., 3.15 A. and 3.00 A. and one strong one at 4.36 A. which are typical of copper ethylenebisdithiocarbamate are repressed to essentially the point of extinction and lines at 8.0 A., 4.48 A. and 3.03 A. become very faint.

Maneb, zineb, and the ethylenebisdithiocarbamates of other individual metals have the following characteristic infrared absorption peaks which are used for the identification of these individual metal ethylenebisdithiocarbamates: at least one sharp band in the 3 to 3.3 micron region (medium), absorption in the 6.5 micron region (strong), three usually sharp bands in the 7 to 8.2 micron region (medium to weak), at least one band at about 9.5 microns (medium), one band in the 10.3 to 10.6 micron region (strong), and one band in the 12.5 to 13 micron region (weak).

Zineb alone or in physical mixtures exhibits the above general characteristic infrared absorption maxima of ethylenebisdithiocarbamates and in addition shows particular specific peaks at 9.55 and 10.25 microns. The coreacted manganese-zinc ethylenebisdithiocarbamate products of this invention lack these specific zineb peaks. Accordingly, they cannot be physical mixtures.

In general, infrared techniques may be employed to show that the other coreacted manganese-metal ethylenebisdithiocarbamates of this invention are not mixtures of the individual salts.

To supply the ethylenebisdithiocarbamate ions there may be used any water-soluble salt of ethylenebisdithiocarbamic acid, including lithium, sodium, potassium, ammonium, quaternary ammonium, calcium, or magnesium salts.

To supply manganese ions there is used any soluble manganous salt, such as the acetate, sulfate, chloride, or nitrate in anhydrous or hydrated form. The manganese salt need not be pure. The other metal salts are supplied by any of the water-soluble chlorides, sulfates, nitrates, acetates, or the like of cobalt, copper, iron, lead, nickel, or zinc or mixtures thereof. Inorganic salts are generally preferred because of economy. Of course, since lead sulfate and chloride are insoluble, it is necessary in the case of lead to choose a combination of salts such that lead and sulfate or chloride ions are not both present. Similarly, if calcium ethylenebisdithiocarbamate is used, sulfate ions are to be avoided. The concentrations of salts in solution may be considerably varied from dilute to saturated. The critical consideration is that the salts when reacted with solution of an ethylenebisdithiocarbamate give at least 5% of insoluble product based on weight of the reaction mixture.

The mixture of manganese salt and one or more other salts is used in a proportion about stoichiometrically equivalent to the ethylenebisdithiocarbamate ions. Metal ions or ethylenebisdithiocarbamate ions can, however, be used in excess, if so desired. Ordinarily, the excess of either will not exceed 10 mole percent. Excess of any component may be left in the product obtained or it may be removed therefrom as by washing or extraction.

The mole ratio of the metallic ions in the mixture of water-soluble salts for reaction with the equivalent of the soluble ethylenebisdithiocarbamate may be varied over a definite range. Superior fungicidal preparations result when the mole ratio of manganese to other metal ions is from 40:60 to 90:10, with a preferred range of ratios of 50:50 to 80:20. The optimum ratio of manganese to metal ions will vary somewhat with respect to the specific metal used in conjunction with manganese and the processing conditions.

The aqueous solution of the mixture of salts of manganese and other metal may be added to the aqueous solution of the ethylenebisdithiocarbamate, the reverse of the above order of addition may be used, or the two reacting solutions may be added simultaneously to a reaction vessel. The simultaneous method of addition is preferred since by this means a continuous process may result.

Reaction between the soluble salt of ethylenebisdithiocarbamic acid and the mixture of manganous salt and other metal salt is effected between about 10° C. and 50° C. in an aqueous system. Concentrations are used which give slurries containing from 5% of the insoluble precipitate up to about 35% by weight, preferably 10% to about 30%. The lower limit results from some reaction or reactions which do not lead to the desired mixed metal salt of ethylenebisdithiocarbamic acid, which reactions are observed when the reaction mixture is more dilute than just noted. On the other hand the upper concentrations are merely those at which it is practical to mix and to bring together the reactants and to handle the resultant slurry of product.

The pH during the reaction may be controlled, if desired, by the presence of buffering agent or acid to bring the reaction mixture within the range pH 2 to pH 11 with a preferred pH range of 3 to 8.

Reaction occurs rapidly, but holding times from 10 minutes to several hours are recommended. In a convenient and useful procedure about stoichiometrically equivalent amounts of manganese and other metal ions in solution are mixed with a solution of a soluble ethylenebisdithiocarbamate at about 40° C. with stirring and with 15 to 25 minutes holding time.

The reaction product may be isolated as by filtering or centrifuging and may then be dried below its decomposition temperature. The reaction mixture may also be allowed to settle and the resulting supernatant liquid separated as by siphoning, and the remaining slurry dried. It is also permissible to dry the entire reaction mixture which, of course, leaves soluble salts in the product thus obtained.

Drying may be accomplished under normal or reduced pressure. Convenient methods of drying the product are spray drying, rotary vacuum drum drying, or tray drying. It is necessary to maintain the products below their decomposition points, and to satisfy this condition the products should be dried so that the temperature of the final dried product remains below about 90° C. For example, the reaction products are desirably dried between 40° and 80° C. under reduced pressures, desirably at pressures of 5 to 30 mm. (Hg). In spray drying, inlet gas temperatures up to about 600° F. (315° C.) may be used but under these conditions the temperature of the drying particles remains well below the decomposition point.

After the product has been dried, it is desirable to ensure the solid is in a finely divided form. For this purpose, there may be used mikropulverizing, micronizing, crushing, screening, or other comminuting techniques. Also, to help ensure finely divided products, there may be utilized, if so desired, at one or more stages of preparation wetting or dispersing agents, such as sodium lignin sulfonate, sodium naphthaleneformaldehyde sulfonate, or sodium dioctylsulfosuccinate or such combinations as surface-active alkylphenoxypolyethoxyethanol and a lignin sulfonate or condensates of polyglycerol and oleic acid and sodium naphthaleneformaldehyde sulfonate.

If desired, the coreacted manganese-metal ethylenebisdithiocarbamates of this invention may be stabilized as by the addition of 0.5 to 4% of hexamethylenetetramine to the slurry to be dried or to the dried product or by the addition of a minor amount of a non-reactive desiccant. They may be rendered flame-resistant as by the addition of at least 20% of their weight of fuller's earth. Also, there may be added synergistic agents, such as calcium polysulfides.

The purity of the products will vary in accordance with their method of isolation and/or the presence of additives.

Analytical values calculated in percent by weight of relatively pure coreacted manganous-metal ethylenebisdithiocarbamates wherein the metal is zinc, copper, nickel, cobalt, or iron (X), when such ethylenebisdithiocarbamates are free of soluble reactants and moisture will be those shown in Tables II A and B, while the coreacted products involving lead (Y) provide the analytical values appearing in Tables III A and B. The range of metal values is given for the extremes of proportions of manganese to other metal with ratios varying from 40:60 to 90:10.

TABLE IIA

*Compositions of coreacted managanese-metal (X) ethylenebisdithiocarbamate*

Substituent: Percent
Carbon disulfide _____ 56.1–57.3
Nitrogen _____ 10.3–10.5
Carbon _____ 17.7–18.1
Hydrogen _____ 2.1–2.3

TABLE IIB

*Ranges of metal content of manganese-metal (X) ethylenebisdithiocarbamates*

Metal: Percent
Manganese _____ 8.1–18.5
Zinc _____ 2.4–14.5
Nickel _____ 2.2–13.2
Cobalt _____ 2.2–13.2
Copper _____ 2.4–14.1
Iron _____ 2.1–12.6

TABLE IIIA

*Compositions of coreacted manganese-metal (Y) ethylenebisdithiocarbamates*

Substituent: Percent
Carbon disulfide _____ 42.7–54.3
Nitrogen _____ 7.9–10.0
Carbon _____ 13.5–17.1
Hydrogen _____ 1.7–2.1

TABLE IIIB

*Ranges of metal content of manganese-metal (Y) ethylenebisdithiocarbamates*

Metal: Percent
Manganese _____ 6.2–17.6
Lead _____ 7.4–34.9

Typical processes and products of the invention are illustrated by the following examples. Parts are by weight unless otherwise designated.

EXAMPLE 1

A solution prepared from 1584 parts of manganous chloride tetrahydrate, 1637 parts of zinc chloride, and 4000 parts of water was added over a period of four hours to an agitated solution of 22,260 parts of a 23% aqueous solution of disodium ethylenebisdithiocarbamate. The temperature of the reaction mixture was maintained in the range of 35° to 42° C. during the addition period and for an additional two hour agitation period. The resulting slurry was filtered by suction and the filter cake was washed with 1000 parts of water. The washed cake was reslurried in 6500 parts of water and then spray dried using an atomizer speed of 40,000 r.p.m., an average inlet air temperature of 285° C. and an average outlet temperature of 130° C. The dried product was micropulverized to give a solid of average particle size of 2.1 microns. There was obtained 4630 parts of a yellowish-white solid which contained by analysis 49.6% of carbon disulfide, 7.3% of manganese, 12.9% of zinc, and 1.5% of water. The product from a carbon disulfide analysis is 89% pure ethylenebisdithiocarbamate. It showed the typical infrared lines of ethylenebisdithiocarbamates, but lacked those which are characteristic of zineb, and is a coreacted manganese-zinc ethylenebisdithiocarbamate. It exhibits the characteristic line or peak at about 7.36 A. in its X-ray diagrams.

EXAMPLE 2

To an agitated solution of 143.5 parts of manganous nitrate hexahydrate and 149 parts of zinc nitrate hexahydrate in 800 parts of water was added a solution of 256 parts of disodium ethylenebisdithiocarbamate in 894 parts of water over a period of 1.5 hours. The batch temperature was maintained at 40° to 44° C. during the addition period and for an additional 1.5 hour holding period. The resulting slurry was filtered by suction. The filter cake was washed with 1500 parts of water and then refiltered. This filter cake was tray dried at ambient temperature for 18 hours and then rotary vacuum dried for six hours at 10 to 18 mm. with a jacket temperature of approximately 75° C. The product, coreacted manganese-zinc ethylenebisdithiocarbamate, amounted to 252 parts and contained by analysis 50.3% of carbon disulfide, 9.2% of manganese, 11.7% of zinc, and less than 0.2% water, and had a particle size of 1.8 microns. According to the CS$_2$ analysis, the product is 89% pure.

EXAMPLE 3

A solution prepared from 936 parts of manganous sulfate dihydrate, 1436 parts of 47.5% aqueous zinc chloride solution, and 5000 parts of water was added with agitation over a period of three hours to 5430 parts of 45% aqueous diammonium ethylenebisdithiocarbamate solution and agitation was continued thereafter for two hours. The batch temperature was maintained at 26° to 29° C. throughout. The product was isolated by filtration and then washed with about 2000 parts of water. The resulting filter cake was tray dried under ambient conditions for 20 hours and then rotary vacuum dried to a final batch temperature of 80° C. at 10 mm. There was obtained 2451 parts of a coreacted manganese-zinc ethylenebisdithiocarbamate which by analysis contained 44.1% of carbon disulfide, 8.7% of manganese and 10.8% of zinc. According to the carbon disulfied analysis, the product is 79% pure ethylenebisdithiocarbamate.

EXAMPLE 4

One thousand parts by volume of an aqueous solution containing 48.4 parts of zinc sulfate and 88.1 parts of manganese chloride was charged to a reactor and there was added thereto at about a constant rate over a period of two hours and with agitation 1000 parts by volume of an aqueous solution containing 256 parts of disodium ethylenebisdithiocarbamate while the temperature was maintained at 23° to 28° C. Agitation was continued for an additional hour. The insoluble precipitate was removed by filtration, thoroughly washed with water to remove essentially all water-soluble materials, air dried overnight, and then rotary vacuum dried over a period of six hours at 2 mm. pressure to a final batch temperature of 28° C. A yellowish-white solid was thus obtained in an amount of 250 parts. It contained by analysis 55.6% of carbon disulfide, 14.3% of manganese, 7.2% of zinc, 17.5% of carbon, 2.2% of hydrogen, and 10.1% of nitrogen. It was a coreacted manganese-zinc ethylenebisdithiocarbamate.

EXAMPLE 5

Into a reactor fitted with an agitator, two feed systems, and a thermometer, was charged 800 parts of water. One feed system was charged with a solution containing 1259 parts of disodium ethylenebisdithiocarbamate hexahydrate in 2740 parts of water and the other with a solution containing 141.7 parts of zinc chloride and 365.6 parts of manganous sulfate in 3400 parts of water. With agitation these two solutions were added simultaneously to the reactor with its initial charge of water warmed to 38° C. at constant rates over a period of one hour. During this time the temperature of the reaction mixture was maintained in the range of 38° to 42° C. A solid precipitated and the resulting slurry was agitated for two hours more. The product was filtered off, washed with 400 parts of water, and dried for 12 hours in a vacuum tray drier using 75° to 80° C. circulating water and 5 to 15 mm. pressure. The product compried 953 parts of a solid which analyzed 49.6% of carbon disulfide, 12.6% of manganese, 6.5% of zinc, and 5.1% of water. The solid was micronized to provide an average particle size of about two microns. It was a coreacted manganese-zinc ethylenebisdithiocarbamate of 88% purity based on the carbon disulfide analysis.

EXAMPLE 6

A continuous synthesis unit was assembled comprising two agitated, jacketed reactors of equal volume and a continuous rotary filter. Two feed systems were provided to the first reactor and pumps were provided to convey slurry from the first reactor to the second reactor and from the second reactor to the filter. The two feed systems were filled with solutions to be used, the first of these an aqueous solution containing 256 grams of disodium ethylenebisdithiocarbamate per liter and the second an aqueous solution containing 121 grams of manganous sulfate and 32.3 grams of zinc sulfate per liter. The two feed solutions were metered at equal rates to the first reactor. During steady state operation, the pump rates were such as to provide an average residence time of one hour in each reactor, and cooling water was circulated through the reactor jackets to maintain the temperature in the range of 20° to 24° C. The slurry from the second reactor was continuously filtered and given one wash during the filtration cycle. The reaction product was collected as a filter cake. A 22.5% aqueous slurry was prepared from the filter cake and fed to a spray drier which operated at an atomizer speed of 40,000 r.p.m., an average inlet temperature of 290° C. and an average outlet temperature of 125° C. Although the product thus obtained was a powder, it was further subdivided by micronizing. The resulting coreacted manganese-zinc ethylenebisdithiocarbamate contained 49.8% of carbon disulfide, 14.5% of manganese, 4.4% of zinc, and 1.1% of water and had an average particle size of 2.2 microns. From the carbon disulfide analysis the product is 88% pure.

EXAMPLE 7

To an agitated reactor containing a solution prepared from 2190 parts of manganous sulfate dihydrate, 373 parts of 47.5% aqueous zinc chloride solution, and 9000 parts of water was added 14,600 parts of commercial aqueous nabam solution containing 22.7% of disodium ethylenebisdithiocarbamate while the temperature was held at 21° to 24° C. The resulting slurry was stirred for two hours more, then filtered on a continuous rotary filter, and given one spray wash during the filtration cycle. The filter cake was then dried in a vacuum pan drier at 10 mm. and a jacket temperature of 75° C. over a period of 24 hours. The dried material was micropulverized at 6950 r.p.m. using a 0.02 inch herringbone screen with six hammers and a corrugated dome. There was obtained 3465 parts of a solid coreacted manganese-zinc ethylenebisdithiocarbamate containing 51.2% of carbon disulfide, 17.1% of manganese, and 2.2% of zinc. By carbon disulfic analysis this material is 90% pure.

EXAMPLE 8

Into a reactor fitted with an agitator, thermometer, and two feed systems was charged 5570 parts of an aqueous solution containing 1280 parts of disodium ethylenebisdithiocarbamate. One feed system was charged with 468 parts of manganous sulfate dihydrate dissolved in 2000 parts of water and the other feed system was charged with 594 parts of nickel chloride hexahydrate dissolved in 2000 parts of water. With agitation the two feeds were added at about equivalent rates over a period of three hours and at 25° to 34° C. Agitation was continued for two hours and the resulting slurry was then filtered at full vacuum. After being washed with 2000 parts of water, the filter cake was rotary vacuum dried at 70° C./5 to 15 mm. The dried, dark brownish-green solid was screened through a 20-mesh screen to provide 1360 parts of a coreacted manganese-nickel ethylenebisdithiocarbamate which analyzed for 48.6% of carbon disulfide, 9.1% of manganese, 9.7% of nickel, and had an average particle size of two microns. By carbon disulfide analysis the product is 85% pure.

For the above nickel chloride solution there was substituted 297 parts of nickel chloride hexahydrate and 350 parts of zinc sulfate heptahydrate, again in 2000 parts of water. The same procedure was followed to yield 1355 parts of a coreacted manganese-nickel-zinc ethylenebisdithiocarbamate which analyzed 52.3% of carbon disulfide, 9.3% of manganese, 4.9% of nickel, and 4.5% of zinc.

EXAMPLE 9

A reactor was charged with 100 parts of water and to this was added simultaneously with agitation at essentially constant rates two separate solutions, one of which was made from 149.7 parts of manganous sulfate dihydrate, 49.8 parts of cobaltous acetate tetrahydrate, and 1000 parts of water and the other from 1200 parts by weight of an aqueous solution containing 364 parts of disodium ethylenebisdithiocarbamate hexahydrate. The addition time was one hour and the addition temperature was 27° to 33° C. The reaction mixture was agitated for two hours and was then filtered by suction. The filter cake was washed with 200 parts of water and air dried. The air-dried cake was vacuum dried with agitation in a chamber held at 50° to 60° C. at 20 to 30 mm. for six hours. There was obtained 285 parts of a brownish-green coreacted manganese-cobalt ethylenebisdithiocarbamate which analyzed 48.4% of carbon disulfide, 14.3% of manganese, and 3.8% of cobalt. By carbon disulfide analysis the product is 85% pure.

EXAMPLE 10

To an agitated solution of 124.5 parts of dipotassium ethylenebisdithiocarbamate in 425 parts of water was added over a period of two hours at 34° to 41° C. a solution prepared from 46.8 parts of manganous sulfate dihydrate, 39.9 parts of cupric sulfate, and 400 parts of water. Agitation was continued for two hours. To the slurry thus obtained was added a small portion of filter aid and the slurry was filtered by suction. The product was washed with 200 parts of water. The solid was then vacuum dried with stirring at 70° C./5 to 10 mm. The dried product was screened through a 20 mesh screen to provide 156 parts of a coreacted manganese-copper ethylenebisdithiocarbamate as a brownish-gray solid having a particle size of 0.8 microns, and which analyzed 44.1% of carbon disulfide, 8.5% of manganese, and 9.7% of copper. This product is 78% pure by carbon disulfide analysis.

EXAMPLE 11

To 100 parts of water with agitation and in a temperature range of 26° to 33° C., there was added simultaneously and at essentially constant rates over a period of one hour the following two solutions: (A) 131 parts of manganous sulfate dihydrate and 48.6 parts of ferric chloride in 885 parts of water, and (B) 364 parts of disodium ethylenebisdiocarbamate hexahydrate in 836 parts of water. The resulting slurry was agitated for two hours longer and then filtered by suction.

The filter cake was washed with 200 parts of water. The solid was then air dried for 18 hours followed by vacuum drying for six hours in an agitated vessel immersed in a 50° to 60° C. water bath at 10 to 15 mm. There was obtained 285 parts of a dark brown, solid coreacted iron - manganese ethylenebisdithiocarbamate analyzing 49.1% of carbon disulfide, 12.6% of manganese, and 5.5% of iron.

In the same way there was reacted a ferrous salt, a solution of 131 parts of manganous sulfate dihydrate, 83.4 parts of ferrous sulfate heptahydrate, and 865 parts of water being substituted for the solution (A) above. The final product was 298 parts of a light brownish-green solid, coreacted iron-manganese ethylenebisdithiocarbamate containing 45.2% of carbon disulfide, 12.6% of manganese and 5.3% of iron.

EXAMPLE 12

Into a reactor equipped with an agitator, two addition funnels, and a thermometer was charged 140 parts of water. One addition funnel was charged with 1000 parts by volume of an aqueous solution prepared from 99.4 parts of lead nitrate and 250 parts of 50% aqueous manganese nitrate solution and the second with 1200 parts of an aqueous solution containing 364 parts of disodium ethylenebisdithiocarbamate hexahydrate. These two feeds were metered into the agitated system over a period of one hour during which time the temperature range was 31° to 36° C. The reaction mixture was agitated for two hours, was then filtered by suction, and the filter cake washed with 200 parts of water. The brownish-yellow solid was air dried at room temperature and then vacuum dried at 50° to 60° C. to give 336 parts of a coreacted manganese-lead ethylenebisdithiocarbamate containing 42% of carbon disulfide, 10.8% of manganese, and 17.4% of lead. The purity corresponds to 86% by carbon disulfide analysis.

These coreacted manganese-metal ethylenebisdithiocarbamates have unusually high fungicidal values compared with those of manganese ethylenebisdithiocarbamate alone. One such test which demonstrates this is the late blight persistency test in which (1) test tomato plants are sprayed to run-off with suspensions of agents under evaluation in a dosage series, (2) the sprayed plants are dried, (3) the dried plants are subjected to a fog of finely atomized water for 16 hours, (4) the plants are dried again, (5) the plants are illuminated for four days, (6) the plants are inoculated with a suspension of 30,000 spores per milliliter of *Phytophthora infestans*, (7) plants are held at 52° to 55° F. and 100% relative humidity (to incubate spores) for about 22 hours, (8) plants are stored in light for 42 hours, and (9) counts of lesions are made. From the counts at the different dosages there are now calculated $ED_{50}$ values; that is, the dosage in parts per million of agent giving 50% control.

This method of evaluation was used with various coreacted manganese-zinc ethylenebisdithiocarbamate preparations. Maneb and zineb were run as standards. The results are conveniently expressed as "Maneb Index," which is a ratio of $$\frac{ED_{50} \text{ value of maneb}}{ED_{50} \text{ value of sample}}$$

For convenience in presenting biological data the coreacted manganese-metal ethylenebisdithiocarbamates are given the designations noted in Table IV.

TABLE IV

*Identification of coreacted manganese-metal ethylenebisdithiocarbamates*

| Compound | Metals Present | Mole Ratio of Metals as Reacted |
|---|---|---|
| A | Manganese: Zinc | 30:70 |
| B | do | 40:60 |
| C | do | 50:50 |
| D | do | 60:40 |
| E | do | 70:30 |
| F | do | 80:20 |
| G | do | 90:10 |
| H | Manganese: Nickelous | 50:50 |
| I | do | 70:30 |
| J | Manganese: Cobaltous | 80:20 |
| K | Manganese: Cupric | 50:50 |
| L | do | 60:40 |
| M | Manganese: Ferric | 70:30 |
| N | Manganese: Ferrous | 70:30 |
| O | Manganese: Lead | 70:30 |

Test data are summarized in Table V for the following typical preparations:

TABLE V

| Compound | Manganese/Zinc, Mole ratio | Maneb Index |
|---|---|---|
| A | 30/70 | 0.5 |
| B | 40/60 | 2.1 |
| C | 50/50 | 2.8 |
| D | 60/40 | 3.0 |
| E | 70/30 | 3.2 |
| F | 80/20 | 2.7 |
| G | 90/10 | 2.2 |
| Maneb | 100/0 | 1.00 |
| Zineb | 0/100 | 0.31 |

In another test (Table VI) dry mixes of various percentages by weight of maneb and zineb were evaluated.

TABLE VI

*Late blight persistency data for mixtures*

Dry mixtures:                       Maneb index
    20% maneb; 80% zineb _____ 0.48
    30% maneb; 70% zineb _____ 0.60
    50% maneb; 50% zineb _____ 0.79
    67% maneb; 33% zineb _____ 0.98
    80% maneb; 20% zineb _____ 0.93
    Maneb _____ 1.00
    Zineb _____ 0.29

The data in Tables V and VI show that the coreacted manganese-zinc ethylenebisdithiocarbamates wherein the mole ratios of manganese to zinc were in the range of 40:60 to 90:10 are much more effective against *Phytophthora infestans* on tomatoes than either maneb or zineb alone or dry mixtures of these two materials.

In other late blight persistency tests the data given in Table VII were obtained.

TABLE VII

*Late blight persistency data*

| Compound | Metals | Ratios | Maneb Index |
|---|---|---|---|
| H | Mn/Ni | 50:50 | 1.2 |
| I | Mn/Ni | 70:30 | 1.2 |
| J | Mn/Co | 80:20 | 1.3 |
| K | Mn/Cu | 50:50 | 1.2 |
| L | Mn/Cu | 60:40 | 1.2 |
| M | Mn/Fe$^{+3}$ | 70:30 | 1.9 |
| N | Mn/Fe$^{+2}$ | 70:30 | 3.3 |
| O | Mn/Pb | 70:30 | 2.6 |
| E | Mn/Zn | 70:30 | 3.0 |
| Maneb | | | 1.0 |
| Zineb | | | 0.25 |

Various ethylenebisdithiocarbamates were applied in sprays to field grown cucumber plants for control of downy mildew (*Pseudoperonospora cubensis*). A sevenday spray schedule was followed starting when the plants had three true leaves. Overhead sprinkler irrigation was used. Applications were made at 1.0 lb. per 100 gallons. Readings were made three weeks after the start of the spray schedule, the number of lesions being counted for the ten leaves which appeared to be most heavily inefected. The average counts are given in Table VIII.

TABLE VIII

*Control of downy mildew on cucumbers*

| Agent: | Lesions per 10 leaves |
|---|---|
| Componnd C, Mn/Zn—50:50 | 12 |
| Compound F, Mn/Zn—80:20 | 8 |
| Compound H, Mn/Ni—50:50 | 18 |
| Maneb | 46 |

The effectiveness of Compounds C, F, and H, typical of the coreacted manganese-metal ethylenebisdithiocarbamates, has also been demonstrated in controlling *Cercospora apii* on celery plants. Treatments of 1.0 lb. per 100 gallons were started on a four-day spray schedule 15 days after the seedlings were transplanted. Overhead sprinkler irrigation was used. Disease control evaluations were made six weeks after the first application. Cercospora lesions were counted on leaflets selected at random. The data are expressed as the average number of disease lesions per 25 leaflets in Table IX.

TABLE IX

*Control of Cercospora on celery*

| Agent: | Lesions per 25 leaves |
|---|---|
| Compound C. Mn/Zn—50:50 | 78 |
| Compound F, Mn/Zn—80:20 | 66 |
| Compound H, Mn/Ni—50:50 | 62 |
| Maneb | 107 |

Favorable results were obtained with the coreacted manganese zinc ethylenebisdithiocarbamates in the control of *Stemphylium solani*, the gray leaf spot of tomatoes. Applications of 1 lb. per 100 gallon of the toxicants were started on tomato plants with three true leaves and continued on a four-day spray schedule. Overhead sprinkler irrigation was used. Six weeks after the first application 20 leaflets were selected from five plants in each plot and the aveage number of disease lesions on them was counted. The number of lesions was 73 with Compound C, and with maneb there were 93.

Favorable results were also obtained in controlling *Alternaria solani* on tomatoes or potatoes, *Septoria apii* on celery, and *Colletotrichum lindemuthianum* and *Uromyces phaseoli* on beans.

These coreacted manganese-metal ethylenebisithiocarbamates can be used in essentially pure form or as the unpurified products. They can be used in any manner comparable to the way in which maneb or zineb is presently used, such as high- and low-gallonage hydraulic sprays, aerial sprays, and dusts. The dilution and rate of application of the coreacted manganese-metal ethylenebisdithiocarbamates will depend upon the type of equipment employed, the method of application, and the disease to be controlled, but the amount is usually one-half to five pounds per acre per application in aqueous sprays in volumes from five to 175 gallons. It is often desirable to add surface-active agents to the spray formulations to improve coverage.

In a typical spray formulation two pounds of coreacted manganese-iron ethylenebisdithiocarbamate made from metal salts present in the mole ratio of 80:20 and four ounces of a condensate of polyglycerol, oleic acid, and phthalic anhydride, are thoroughly mixed with about 10 gallons of water with agitation. This mixture is then diluted to about 100 gallons with water to form an effective spray. Instead of the above condensate there may be used a commercial product identified as glycerol mannitan laurate or sorbitolester condensates with ethylene oxide.

The coreacted manganese-metal ethylenebisdithiocarbamates may be made into dust formulations by the incorporation of extenders such as natural clays, diatomaceous earth, pyrophyllite, talc, calcium silicate, or magnesium carbonates, or sulfur. Such a dust is made, for example, by blending 10 parts of coreacted manganese-zinc ethylenebisdithiocarbamate containing 7.3% of manganese and 12.9% of zinc with 90 parts of calcium carbonate.

If desired, such dust formulation may be treated with 0.5 to 2% of a dispersing agent, such as lignin sulfonate or sodium formaldehyde-naphthalene sulfonate. Also, if desired, wettable powders may be prepared from the coreacted manganese-metal ethylenebisdithiocarbamates by admixing therewith one or more wetting agents, also, if desired, a dispersing agent and for some applications a solid finely divided carrier. For example, a coreacted manganese-copper ethylenebisdithiocarbamate with metals from salts in a 50/50 mole ratio is mixed with a commercial product containing 60 percent of magnesium carbonate and 40% of cetylphenoxypolyethoxyethanol having about 10 ether groups and fuller's earth in a weight ratio of 50:5:45.

These coreacted manganese-metal ethylenebisdithiocarbamates can be used alone or in conjunction with known fungicides, such as dinitro(1-methylheptyl)phenyl crotonate, fixed coppers, or sulfur, or with insecticides and miticides such as 1,1,1-trichloro-2,2-bis-(p-chlorophenyl)-ethane, 1,1-bis(p-chlorophenyl)-2,2,2-trichloroethanol, 2-(p-tert-butylphenoxy)isopropyl 2-chloroethyl sulfite, and organic phosphorus compounds such as parathion or malathion or combinations of these.

We claim:

1. A process for preparing a coreacted manganese-metal ethylenebisdithiocarbamate which comprises forming an aqueous solution of a water-soluble manganese salt and a water-soluble salt of other metal from the class consisting of cobalt, copper, iron, lead, nickel, and zinc, the said manganese salt and said other metal salt providing a soluble mixture and the mole ratio of manganese salt to said other metal salt being from 40:60 to 90:10, and mixing between 10° and 50° C. said aqueous solution and a solution of a water-soluble salt of ethylenebisdithiocarbamic acid in a proportion about stoichiometrically equivalent to both the manganese and other metal salts, the concentrations of solution of manganese and other metal salt and of solution of said salt of ethylenebisdithiocarbamic acid being sufficient to form water-insoluble coreacted manganese-metal ethylenebisdithiocarbamate in an amount of at least 5% by weight of the reaction mixture.

2. A process for preparing a coreacted manganese-metal ethylenebisdithiocarbamate which comprises forming an aqueous solution of a water-soluble manganese salt and a water-soluble salt of other metal from the class consisting of cobalt, copper, iron, lead, nickel, and zinc, the said manganese salt and said other metal salt providing a soluble mixture and the mole ratio of manganese salt to said other metal salt being from 50:50 to 80:20, and mixing between 20° and 45° C. said aqueous solution and a solution of a water-soluble salt of ethylenebisdithiocarbamic acid in a proportion about stoichiometrically equivalent to both the manganese and other metal salts, the concentrations of solution of manganese and other metal salt and of solution of said salt of ethylenebisdithiocarbamic acid being sufficient to form water-insoluble coreacted manganese-metal ethylenebisdithiocarbamate in an amount of at least 5% by weight of the reaction mixture.

3. A process for preparing a coreacted manganese-metal ethylenebisdithiocarbamate which comprises forming an aqueous solution of a water-soluble manganese salt and a water-soluble salt of other metal from the class consisting of cobalt, copper, iron, lead, nickel, and zinc, the said manganese salt and said other metal salt providing a soluble mixture and the mole ratio of manganese salt to said other metal salt being from 40:60 to 90:10, mixing between 10° and 50° C. said aqueous solution and a solution of a water-soluble salt of ethylenebisdithiocarbamic acid in a proportion about stoichiometrically equivalent to both the manganese and other metal salts, the concentrations of solution of manganese and other metal salt and of solution of said salt of ethylenebisdithiocarbamic acid being sufficient to form water-insoluble coreacted manganese-metal ethylenebisdithiocarbamate in an amount of at least 5% by weight of the reaction mixture, isolating said water-insoluble coreacted manganese-metal ethylenebisdithiocarbamate from the reaction mixure, and drying said isolated coreacted manganese-metal ethylenebisdithiocarbamate below its decomposition temperature.

4. The process of claim 3 in which drying is accomplished under reduced pressure.

5. The process of claim 3 in which drying is accomplished by spray drying with an inlet gas temperature below 315° C.

6. A process for preparing a coreacted manganese-metal ethylenebisdithiocarbamate which comprises forming an aqueous solution of a water-soluble manganese salt and a water-soluble salt of other metal from the class consisting of cobalt, copper, iron, lead, nickel, and zinc, the said manganese salt and said other metal salt providing a mixture in solution and the mole ratio of manganese salt to said other metal salt being from 50:50 to 80:20, and mixing between 20° and 45° C. said aqueous solution and a solution of a water-soluble salt of ethylenebisdithiocarbamic acid in a proportion about stoichiometrically equivalent to both the manganese and other metal salts, the concentrations of solution of manganese and other metal salt and of solution of said salt of ethylenebisdithiocarbamic acid being sufficient to form water-insoluble coreacted manganese-metal ethylenebisdithiocarbamate in an amount from 10 to 30% by weight of the reaction mixture, isolating said water-insoluble coreacted manganese-metal ethylenebisdithiocarbamate from the reaction mixture, and drying said isolated coreacted manganese-metal ethylenebisdithiocarbamate below its decomposition temperature.

7. A process for preparing a coreacted manganese-zinc ethylenebisdithiocarbamate which comprises forming an aqueous solution of a water-soluble manganese salt and a water-soluble zinc salt, the said manganese salt and said zinc salt providing a soluble mixture and the mole ratio of manganese salt to zinc salt being from 50:50 to 80:20, and mixing between 20° and 45° C. said aqueous solution and a solution of a water-soluble salt of ethylenebisdithiocarbamic acid in a proportion about stoichiometrically equivalent to both the manganese and the zinc salts, the concentration of solution of manganese and zinc salts and of solution of said salt of ethylenebisdithiocarbamic acid being sufficient to form water-insoluble coreacted manganese-zinc ethylenebisdithiocarbamate in an amount of at least 5% by weight of the reaction mixture.

8. A process for preparing a coreacted manganese-cupric ethylenebisdithiocarbamate which comprises forming an aqueous solution of a water-soluble manganese salt and a water-soluble cupric salt, the said manganese salt and said cupric salt providing a soluble mixture and the mole ratio of manganese salt to cupric salt being from 40:60 to 90:10, and mixing between 20° and 45° C. said aqueous solution and a solution of a water-soluble salt of ethylenebisdithiocarbamic acid in a proportion about stoichiometrically equivalent to both the manganese and the cupric salts, the concentration of solution of manganese and cupric salts and of solution of said salt of ethylenebisdithiocarbamic acid being sufficient to form water-insoluble coreacted manganese-cupric ethylenebisdithiocarbamate in an amount of at least 5% by weight of the reaction mixture.

9. A process for preparing a coreacted manganese-nickelous ethylenebisdithiocarbamate which comprises forming an aqueous solution of a water-soluble manganese salt and a water-soluble nickelous salt, the said manganese salt and said nickelous salt providing a soluble mixture and the mole ratio of manganese salt to nickelous salt being from 40:60 to 90:10, and mixing between 20° and 45° C. said aqueous solution and a solution of a water-soluble salt of ethylenebisdithiocarbamic acid in a proportion about stoichiometrically equivalent to both the manganese and the nickelous salts, the concentration of solution of manganese and nickelous salts and of solution of said salt of ethylenebisdithiocarbamic acid being sufficient to form water-insoluble coreacted manganese-nickelous ethylenebisdithiocarbamate in an amount of at least 5% by weight of the reaction mixture.

10. A water-insoluble coreacted manganese-zinc ethylenebisdithiocarbamate containing 8.1 to 18.3% of manganese and 2.4 to 14.6% of zinc, the mole ratio of manganese to zinc being from 40:60 to 90:10, the pure coreacted manganese-zinc ethylenebisdithiocarbamate yielding 56.2 to 57.2% of carbon disulfide, and said coreacted manganese-zinc ethylenebisdithiocarbamate giving X-ray diffraction peaks at relative intensities of 8.0 A. (medium), 7.36 A. (medium), 6.9 A. (medium), 6.5 A. (weak), 4.5 A. (medium), and 3.0 A. (medium).

11. A water-insoluble coreacted manganese-cupric ethylenebisdithiocarbamate containing 8.1 to 18.3% of manganese and 2.3 to 14.1% of copper, the mole ratio of manganese to copper being from 40:60 to 90:10, the pure coreacted manganese-copper ethylenebisdithiocarbamate yielding 56.2 to 57.2% of carbon disulfide, and said coreacted manganese-cupric ethylenebisdithiocarbamate giving X-ray diagrams with broad peaks at 7.65–7.80 A. (medium) and at about 3.86 A. (medium).

12. A water-insoluble coreacted manganese-ferric ethylenebisdithiocarbamate containing 8.1 to 18.3% of manganese and 2.0 to 12.3% of iron, the mole ratio of manganese to iron being from 40:60 to 90:10, the pure coreacted manganese-iron ethylenebisdithiocarbamate yielding 56.2 to 57.2% of carbon disulfide, and said coreacted manganese-ferric ethylenebisdithiocarbamate giving X-ray diagrams having lines common to manganese ethylenebisdithiocarbamate but of reduced relative intensities and a broad peak at about 6.5 to 7.5 A. (medium).

13. A water-insoluble coreacted manganese-metal ethylenebisdithiocarbamate containing, in addition to manganese, a metal from the class consisting of cobalt, copper, iron, lead, nickel and zinc, the mole ratio of manganese to said metal being from 40:60 to 90:10, the manganese content being from 6.2 to 18.3%, the cobalt and nickel contents being from 2.2 to 13%, the copper content being from 2.3 to 14.1%, the iron content being from 2.0 to 12.3%, the lead content being from 7.4 to 35.9% and the zinc content being from 2.4 to 14.6%, said coreacted manganese-metal ethylenebisdithiocarbamate yielding 43.9 to 57.2% of carbon disulfide and said manganese-metal ethylenebisdithiocarbamate giving X-ray diagrams having lines common to manganese ethylenebisdithiocarbamate but of different relative intensities and lines characterized by breadth, in the case wherein copper is used as the coreacted metal the strong lines characteristic of manganese ethylenebisdithiocarbamate at 8.00 A., 4.48 A. and 3.03 A. being reduced to very weak intensity and characteristic peaks being present at 7.65–7.80 A. (medium) and at about 3.86 A. (medium), in the case wherein ferric ions are used as the coreacted metals the strong lines characteristics of manganese ethylenebisdithiocarbamate at 8.00 A., 4.48 A. and 3.03 A. being reduced to medium intensity and a broad peak appearing at 6.5–7.5 A. (medium), in the case wherein ferrous ions are used as the coreacted metal the strong lines characteristic of manganese ethylenebisdithiocarbamate at 8.00 A., 4.48 A. and 3.03 A. being reduced to medium, the medium lines at 6.90 A. and 6.51 A. being increased in intensity, and a new line appearing at 7.36 A. (medium), in the case wherein lead is used as the coreacted metal the strong lines characteristic of manganese ethylenebisdithiocarbamate at 8.00 A., 4.48 A. and 3.03 A. being reduced in intensity and characteristic peaks appearing at 9.60 A. (strong), 5.47 A. (weak) and 4.93 A. (weak), and in the cases wherein cobalt and nickel are used as the coreacted metals the strong lines characteristic of manganese ethylenebisdithiocarbamate at 8.00 A., 4.48 A. and 3.03 A. being reduced to medium and broadened, and in the case wherein zinc is used as the coreacted metal the strong lines characteristic of manganese ethylenebisdithiocarbamate at 8.00 A., 4.48 A. and 3.03 A. being reduced to medium intensity, the medium line at 6.51 A. being reduced to weak, and a characteristic peak being present at 7.36 A. (medium).

References Cited by the Examiner

UNITED STATES PATENTS 3,082,229  3/63  Nash _____ 260—429.9

FOREIGN PATENTS 200,562  12/55  Australia.
210,433  8/60  Austria.

TOBIAS E. LEVOW, Primary Examiner.

A. LOUIS MONACELL, ABRAHAM H. WINKELSTEIN, Examiners.